United States Patent [19]

Tsuru et al.

[11] Patent Number: 4,579,146
[45] Date of Patent: Apr. 1, 1986

[54] THREE-PORT SOLENOID-OPERATED VALVE

[75] Inventors: Naohiko Tsuru, Okazaki; Yoshihisa Nomura; Nobuyasu Nakanishi, both of Toyota, all of Japan

[73] Assignees: Nippondenso Co., Ltd., Kariya; Toyota Jidosha Kabushiki Kaisha, Toyota, both of Japan

[21] Appl. No.: 765,526

[22] Filed: Aug. 14, 1985

[30] Foreign Application Priority Data

Aug. 30, 1984 [JP] Japan ............................... 59-181416

[51] Int. Cl.⁴ ............................................ F15B 13/044
[52] U.S. Cl. ............................. 137/627.5; 137/596.17
[58] Field of Search ................. 137/596.17, 627.5, 870

[56] References Cited

U.S. PATENT DOCUMENTS

| | | | |
|---|---|---|---|
| 3,921,666 | 11/1975 | Leiber ........................ | 137/596.17 X |
| 3,970,111 | 7/1976 | Brune et al. ............... | 137/596.17 X |
| 3,989,063 | 11/1976 | Brouwers et al. .......... | 137/596.17 |
| 4,526,203 | 7/1985 | Leiber ....................... | 137/596.17 X |
| 4,534,382 | 8/1985 | Tanguy ...................... | 137/596.17 X |

FOREIGN PATENT DOCUMENTS 2711140 9/1978 Fed. Rep. of Germany ... 137/627.5

58-17169 4/1983 Japan.

*Primary Examiner*—Gerald A. Michalsky
*Attorney, Agent, or Firm*—Cushman, Darby & Cushman

[57] ABSTRACT

A three-port solenoid-operated valve has a fluid passage defined in a solenoid, a first port at an inlet end of the fluid passage, and second and third ports at an outlet end of the fluid passage. A cylindrical plunger is movably disposed in the fluid passage, and a slider is slidably supported in the plunger. A first-port valve body is normally urged by a first spring to be held against an end surface of the slider for opening the first port when the solenoid is de-energized. A third-port valve body is normally urged by a second spring for closing the third port when the solenoid is de-energized and is energized by a lower current. A pusher is fixedly mounted in the plunger for pushing the third-port valve body in a direction to open the third port in response to movement of the plunger when the solenoid is energized by a higher current. A third spring acts between the pusher and the opposite end surface of the slider for normally urging the pusher and the slider apart from each other. The second spring has a smallest spring force, the third spring has a largest spring force, and the first spring has an intermediate spring force between the spring forces of the second and third springs.

10 Claims, 4 Drawing Figures

THREE-PORT SOLENOID-OPERATED VALVE

BACKGROUND OF THE INVENTION

The present invention relates to a three-port solenoid-operated valve having an inlet port, an outlet port, and a relief port.

Three-port solenoid-operated valves have found wide use as directional control valves which interconnect a pipe for delivering a fluid under pressure to a hydraulically operated device, a relief pipe for bleeding off the fluid under pressure from the hydraulically operated device, and a supply pipe extending from a hydraulic pressure source. One typical type of three-port solenoid-operated valve has a fluid passage defined in a cylindrical solenoid and having ports at its ends, and a plunger disposed in the fluid passage and movable in response to energization of the solenoid. The plunger has valve bodies disposed on its ends and movable into and out of contact with the respective valve seats in the ports. The valve bodies are biased by respective springs for assisting themselves in opening and closing the ports.

Since the fluid in the hydraulic circuit is normally kept under high pressure, the springs used in the three-port solenoid-operated valve for biasing the valve bodies are constructed to produce large spring forces. If these springs fail to function properly due to fatigue, then the valve will not operate to open and close the ports as desired. When the spring biasing the valve body to open the inlet port, in particular, fails to function, then the inlet port is not opened since the spring that urges the same valve body to close the inlet port is strong enough to keep the inlet port closed. Therefore, the three-port solenoid-operated valve does not operate even if there is a hyraulic pressure applied to the inlet port by the hydraulic pressure source.

SUMMARY OF THE INVENTION

It is an object of the present invention to provide a three-port solenoid-operated valve having a fail-safe mechanism for opening an inlet port by applying a slightly increased fluid pressure to the inlet port when the spring placed in the valve for keeping the inlet port open is broken or otherwise fails to function properly.

According to the present invention, there is provided a three-port solenoid-operated valve including a first port disposed at an inlet end of a fluid passage defined by a solenoid mounted in a casing, a second port disposed at an outlet end of the fluid passage, a third port disposed at the outlet end, a cylindrical plunger movable in the fluid passage in response to energization of the solenoid, a slider slidably supported in the plunger and having a first end portion facing the first port and a second end surface facing the third port, a first spring, a first-port valve body normally urged by the first spring to be held against the first end surface for opening the first port when the solenoid is de-energized, a second spring, a third-port valve body normally urged by the second spring for closing the third port when the solenoid is de-energized and is energized by a lower current, a pusher fixedly mounted in the plunger for pushing the third-port valve body in a direction to open the third port in response to movement of the plunger when the solenoid is energized by a higher current, and a third spring acting between the pusher and the second end surface of the slider for normally urging the pusher and the slider apart from each other. The second spring has a smallest spring force, the third spring has a largest spring force, and the first spring has an intermediate spring force between the spring forces of the second and third springs.

If the first spring which is subject to frequent load variations is broken or fails to function properly, the first port is closed by the first-port valve body under the spring force of the second spring. However, the first port can easily be opened by slightly increasing the fluid pressure applied thereto since the spring force of the second spring is smallest. Therefore, undesired interruption of the fluid communication between the first and second ports can immediately be eliminated, thus avoiding any accidental trouble which would result from the interruption of the fluid communication.

BRIEF DESCRIPTION OF THE DRAWINGS

The present invention will be described in detail by way of illustrative example with reference to the accompanying drawings, in which.

DETAILED DESCRIPTION

Figure 1:
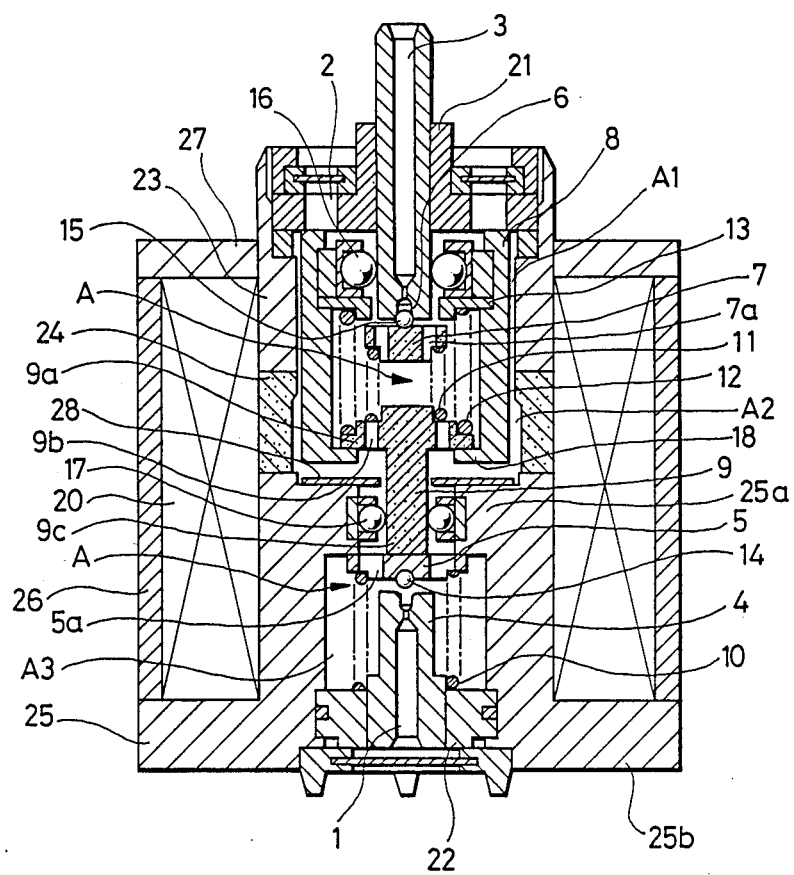
FIGS. 1 through 3 are cross-sectional views of a three-port solenoid-operated valve according to the present invention, the views showing the parts positioned when the solenoid is inactivated, and energized with weak and strong currents, respectively.

As shown in FIG. 1, a three-port solenoid-operated valve according to the present invention includes a solenoid 20 in the form of a hollow cylinder for generating electromagnetic forces to operate the valve. The three-port solenoid-operated valve has a fluid passage A defined axially in the cylindrical solenoid 20 and doubling as a chamber for reserving a fluid therein. The valve also includes a first port 1 disposed in an inlet end of the fluid passage A and having a valve seat 4, a second port 2 disposed in an outlet end of the fluid passage A and having no valve seat, and a third port 2 disposed in the outlet end of the fluid passage A and having a valve seat 6. The first port 1 is defined axially in a cylindrical member projecting into the fluid passage A. The third port 3 is similarly defined axially in a cylindrical member projecting into the fluid passage A. The second port 2 is defined in an end member 21 fitted over the cylindrical member of the third port 3. The valve seats 4, 6 are positioned in the fluid passage A.

A cylindrical plunger 8 of a magnetic material is disposed in the fluid passage A closely to the second and third ports 2, 3, the plunger 8 being movable back and forth axially in the fluid passage A in response to energization and de-energization of the solenoid 20. A slider 9 of a nonmagnetic material is also disposed in the fluid passage A and includes a larger-diameter portion 9a movably supported in the plunger 8 and held against an annular flange 18 of the plunger 8. The larger-diameter portion 9a has axial communication holes 9b. The slider 9 also includes an axial shank 9c extending out of the plunger 8 toward the valve seat 4 of the first port 1.

A valve body 5 having a steel ball 14 is held against the end of the shank 9c of the slider 9, the steel ball 14 being positioned in axial alignment with the valve seat 4. The valve body 5 which has axial communication holes 5a is resiliently pressed against the end the slider shank 9c under the force of a first compression spring 10 acting between the valve body 5 and an end member 22 closing the inlet end of the fluid passage A and supporting the cylindrical member of the first port 1.

A valve body 7 of a nonmagnetic material having a steel ball 15 is urged by a second compression spring 11 to press the steel ball 15 against the valve seat 6, the valve body 7 having axial communication holes 7a. The spring 11 acts between the valve body 7 and the larger-diameter portion 9a of the slider 9. An annular pusher 13 is attached to an inner wall surface of the plunger 8 for pushing the valve body 7 in a direction to open the third port 8 when the plunger 8 is axially moved away from the end member 21. A third compression spring 12 is interposed between the pusher 13 and the end of the larger-diameter portion 9a of the slider 9 for normally biasing the pusher 13 and the slider 9 apart from each other. The spring forces produced by the first through third springs 10, 11, 12 are selected such that the spring force of the second spring 11 is weakest, the spring force of the third spring 12 is strongest, and the spring force of the first spring 10 is of an intermediate level between the spring forces of the second and third springs 11, 12.

The fluid passage A is composed of an upper (FIG. 1) passage portion A1 defined by a cylindrical body 23, an intermediate passage portion A2 defined by a cylindrical body 24 of a nonmagnetic material, and a lower passage portion A3 defined by a cylindrical body 25 having a radially inwardly extending flange 25a and a radially outwardly extending flange 25b. The end member 22 is supported in the cylindrical body 25. A sliding bearing 16 is disposed between the plunger 8 and the outer peripheral surface of the cylindrical member of the third port 3, the sliding bearing 16 serving as a guide for sliding movement of the plunger 8 in the axial direction in the fluid passage A. The slider 9 is guided in its axial sliding movement in the fluid passage A by a sliding bearing 17 disposed between the outer peripheral surface of the shank 9c of the slider 9 and the inner peripheral surface of the radially inward flange 25a of the cylindrical body 25.

An annular end plate 27 is mounted on the cylindrical body 23, and a cylindrical cover 26 is positioned axially between the annular end plate 27 and the radially outward flange 25b of the cylindrical body 25. The annular end plate 27, the cylindrical bodies 23, 25, and the cylindrical cover 26 jointly provide a cylindrical casing in which the solenoid 20 is housed. An annular magnetic shield 28 is attached to the end surface of the cylindrical body 25 which faces the intermediate passage portion A2, the shank 9c of the slider 9 extending through the annular magnetic shield 28.

Figure 4:
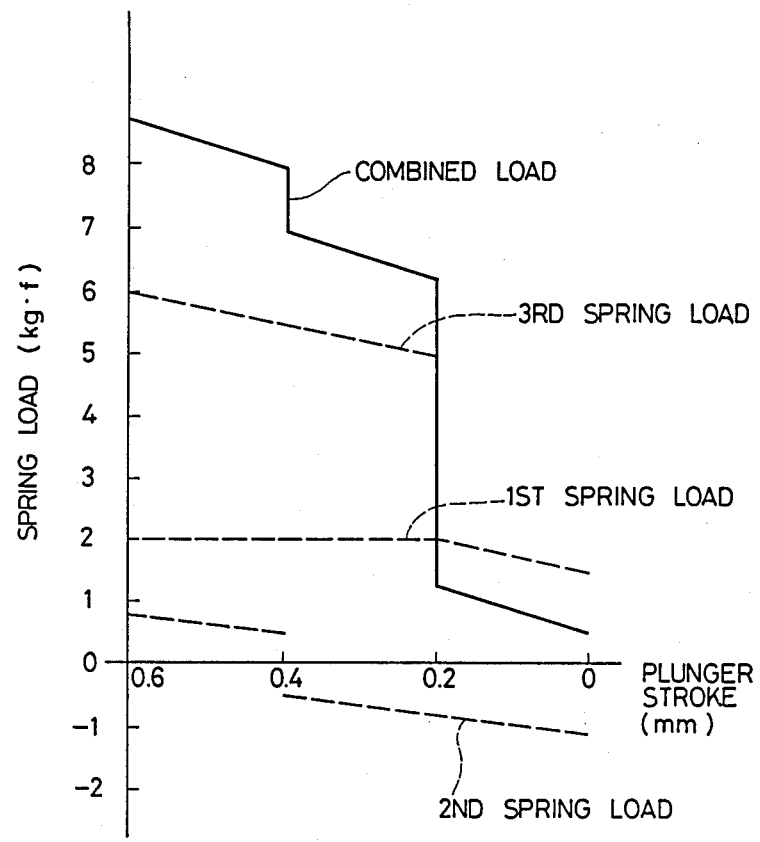
FIG. 4 is a graph showing the manner in which the loads imposed on springs acting on the valve bodies in the three-port solenoid-operated valve are varied as the plunger of the valve is moved under electromagnetic forces.

FIG. 4 shows the manner in which the spring forces exerted by the first, second, and third springs 10, 11, 12 on the plunger 8 vary as the plunger 8 is axially moved under electromagnetic forces generated by the solenoid 20. The graph of FIG. 4 has a horizontal axis representing the distance or stroke of movement of the plunger 8, and a vertical axis indicating the loads imposed by the first, second, and third springs 10, 11, 12 on the plunger 8, by dotted lines, and the combined load by a solid line. In the graph, the stroke of the plunger 8 increases progressively leftwards. The spring forces having positive values on the graph indicate forces applied upwardly to the plunger 8, and those having negative values on the graph indicate forces applied downwardly to the plunger 8. At the stroke position 0 mm on the horizontal axis, the solenoid 20 is de-energized, and the third spring 12 imposes no spring forces on the plunger 8. When the solenoid 20 is energized by a weak current, the plunger 8 is moved downwardly (as shown) for a small interval. At this time, the first port 1 remains closed by the spring-loaded valve body 5. The spring force of the first spring 10 will thereafter remain unchanged even when the current by which the solenoid 20 is energized is continuously increased. The third spring 12 starts being subject to the downward force from the plunger 8 through the pusher 13 and starts exerting its spring force on the plunger 8. The spring force of the second spring 11 which acts downwardly on the plunger 8 is progressively reduced as the slider 9 is allowed to descend by the plunger 8 under the force of the third spring 12.

As the current flowing through the solenoid 20 increases, the plunger 8 is axially moved to cause the pusher 13 to contact and start to press the valve body 7. The spring force imposed by the second spring 11 on the plunger 8 now changes its direction and acts to move the plunger 8 upwardly. The absolute value of the spring force of the second spring 11 is much smaller than that of the third spring 12, i.e., about ⅛ of the spring force of the third spring 12. This will allow the first port 1 to be forcibly opened by slightly increasing the fluid pressure applied to the first port 1, even if the first spring 10 is broken and fails to open the first port 1. Therefore, the solenoid-operated valve can operate without the danger of undesirable emergency troubles which would otherwise result from the interruption of the fluid flow through the solenoid-operated valve.

Operation of the three-port solenoid-operated valve shown in FIG. 1 is as follows: The first port 1, the second port 2, and the third port 3 serve as an inlet port, an outlet port, and a relief port, respectively. When the solenoid 20 is not energized, the cylindrical plunger 8 is subject to the upward (as shown in FIG. 1) force imposed by the first spring 10 through the first valve body 5, the slider 9, the third spring 12, and the pusher 13. At the same time, the cylindrical plunger 8 is subject to the downward spring force of the second spring 11 via the flange 18 at the bottom of the plunger 8 and the slider 9. Since the spring force of the first spring 10 is greater than that of the second spring 11, the plunger 8 remains in its uppermost limit position with the steel ball 14 unseated off the valve seat 4 to open the first port 1. The first port 1 and the second port 2 are held in fluid communication with each other through the communication holes 5a, 9b, 7a. The third port 3 remains closed since the steel ball 15 is seated on the valve seat 6 under the force of the second spring 11.

Figure 2:
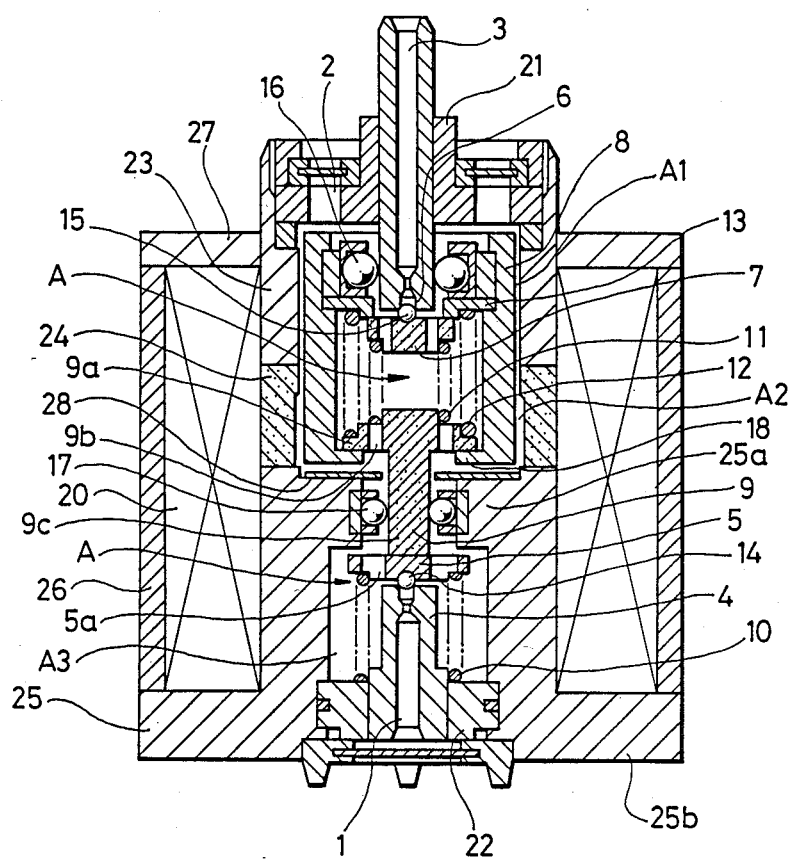
Figure 3:
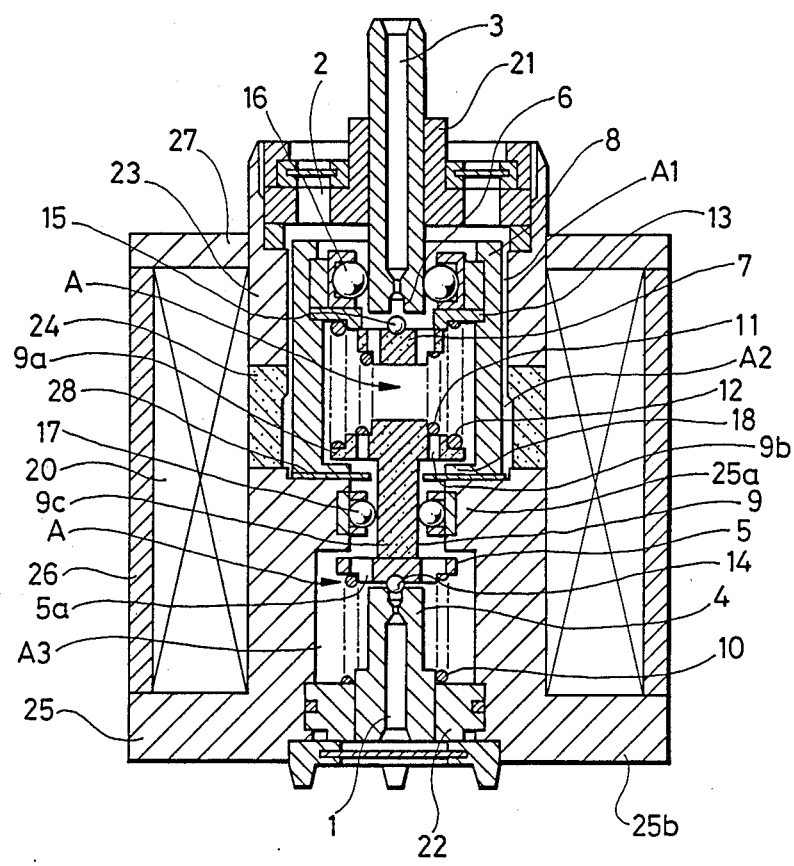

When a weak current is passed through the solenoid 20, the plunger 8 is moved under a weak downward electromagnetic force to cause the pusher 13, the third spring 12, and the slider 9 to lower the valve body 5 until the steel ball 14 is seated on the valve seat 4 to close the first port 1, as shown in FIG. 2. At this time, the third port 3 remains closed by the steel ball 15 seated on the valve seat 6. Therefore, the fluid communication between the first port 1 and the second port 2 is now shut off.

When the solenoid 20 is supplied with a stronger current, the plunger 8 is further moved downwardly to enable the pusher 13 to lower the valve body 7 to unseat the steel ball 15 off the valve seat 6, thereby opening the third port 3. The first port 1 remains closed at this time.

The second port 2 and the third port 3 are now brought into fluid communication with each other.

The second spring 11 is less often subject to varying loads than the first spring 10, and is designed to produce a smaller spring force. The third spring 12 is subject to a constant load when the solenoid 20 is energized, but is most rugged among the three springs. However, the first spring 10 suffers frequent load variations, is loaded at all times, and is less rugged than the third spring 12. Therefore, the first spring 10 is mostly likely to be broken due to fatigue. If the first spring 10 should be broken, then the first port 1 would be closed under the force of the second spring 11. Then, the first port 1 could not be opened even under the control of the solenoid 20, and the fluid-operated device connected to the second port 2 would not be controlled as no fluid pressure would be supplied from the first port 1, resulting in an emergency trouble due to the interruption of the fluid communication between the first and second ports 1, 2. With the arrangement of the present invention, such an emergency problem can be avoided by slightly increasing the fluid pressure acting on the first port 1 to displace the valve body 5 in a direction to unseat the steel ball 14 off the valve seat 4 against the spring force of the second spring 11 which is smallest among the three springs. Accordingly, the three-port solenoid-operated valve of the present invention can be used as a fail-safe directional control valve in a fluid-pressure circuit such as a hydraulic circuit.

Although a certain preferred embodiment of the present invention has been shown and described in detail, it should be understood that various changes and modifications may be made therein without departing from the scope of the appended claims.

We claim:
1. A three-port solenoid-operated valve comprising:
   (a) a casing;
   (b) a solenoid supported in said casing and defining therein a fluid passage having inlet and outlet
   (c) a first port disposed at said inlet end;
   (d) a second port disposed at said outlet end;
   (e) a third port disposed at said outlet end;
   (f) a cylindrical plunger movable in said fluid passage in response to energization of said solenoid;
   (g) a slider slidably supported in said plunger and having a first end surface facing said first port and a second end surface facing said third port;
   (h) a first spring;
   (i) a first-port valve body normally urged by said first spring to be held against said first end surface for opening said first port when said solenoid is de-energized;
   (j) a second spring;
   (k) a third-port valve body normally urged by said second spring for closing said third port when said solenoid is de-energized and is energized by a lower current;
   (l) a pusher fixedly mounted in said plunger for pushing said third-port valve body in a direction to open said third port in response to movement of said plunger when said solenoid is energized by a higher current; and
   (m) a third spring acting between said pusher and said second end surface of said slider for normally urging said pusher and said slider apart from each other, said second spring having a smallest spring force, said third spring having a largest spring force, and said first spring having an intermediate spring force between the spring forces of said second and third springs.

2. A three-port solenoid-operated valve according to claim 1, wherein said first and third ports have valve seats, respectively, said first-port and third-port valve bodies having steel balls, respectively, for being seated on said first and third ports, respectively.

3. A three-port solenoid-operated valve according to claim 1, wherein said slider comprises a larger-diameter portion movably disposed in said plunger and having said second end surface, and a shank extending out of said plunger and having said first end surface.

4. A three-port solenoid-operated valve according to claim 3, wherein said plunger has a flange against which said larger-diameter portion of the slider is held under the resiliency of said third spring.

5. A three-port solenoid-operated valve according to claim 3, wherein said second spring acts between said third-port valve body and said larger-diameter portion of the slider.

6. A three-port solenoid-operated valve according to claim 3, wherein said third spring acts between said pusher and said larger-diameter portion of the slider.

7. A three-port solenoid-operated valve according to claim 3, including a bearing interposed between said casing and said shank of the slider for guiding movement of said slider.

8. A three-port solenoid-operated valve according to claim 1, including an end member supported by said casing in said inlet end, said first spring acting between said first-port valve body and said end member.

9. A three-port solenoid-operated valve according to claim 1, including a cylindrical member defining said third port therein, and a bearing interposed between said plunger and said cylindrical member for guiding movement of said plunger.

10. A three-port solenoid-operated valve according to claim 1, wherein each of said first, second, and third springs comprises a compression coil spring.

* * * * *